United States Patent [19]
Di Leo

[11] Patent Number: 5,614,092
[45] Date of Patent: Mar. 25, 1997

[54] FILTER FOR THE SEPARATION OF SOLIDS AND LIQUIDS FROM MUDS AND SPECIFICALLY THOSE FROM INDUSTRIAL PROCESSING

[75] Inventor: Vincenzo Di Leo, Milan, Italy

[73] Assignee: Idee & Prodotti S.r.l., Milan, Italy

[21] Appl. No.: 545,584

[22] PCT Filed: May 11, 1994

[86] PCT No.: PCT/EP94/01519

§ 371 Date: Nov. 3, 1995

§ 102(e) Date: Nov. 3, 1995

[87] PCT Pub. No.: WO94/26386

PCT Pub. Date: Nov. 24, 1994

[30] Foreign Application Priority Data

May 11, 1993 [IT] Italy ................... MI93A0951

[51] Int. Cl.$^6$ ............................................. B01D 25/133
[52] U.S. Cl. ................. 210/350; 210/416.1; 210/497.01
[58] Field of Search ................... 210/350, 416.1, 210/448, 452, 459, 497.01

[56] References Cited

U.S. PATENT DOCUMENTS

| 4,124,499 | 11/1978 | Hobbs et al. | 210/350 |
|---|---|---|---|
| 4,714,557 | 12/1987 | Croket . | |
| 4,795,570 | 1/1989 | Young . | |
| 4,836,937 | 6/1989 | Homer | 210/350 |
| 4,851,132 | 7/1989 | Di Leo | 210/224 |
| 5,022,995 | 6/1991 | Roy et al. . | |

FOREIGN PATENT DOCUMENTS 1489171  6/1967  France .

*Primary Examiner*—W. L. Walker
*Attorney, Agent, or Firm*—Rothwell, Figg, Ernst & Kurz

[57] ABSTRACT

A filter for the separation of solids and liquids from muds, and specifically those from industrial processing, includes a container and a filtering bag housed in the container for reception of the muds. The filter further includes a deformable membrane housed in the container and defining therein a closed volume of variable size. A fluid pump is provided, communicating with the volume, to vary the size of the volume by pumping fluid into the volume, thereby squeezing the filtering bag in the container.

25 Claims, 3 Drawing Sheets

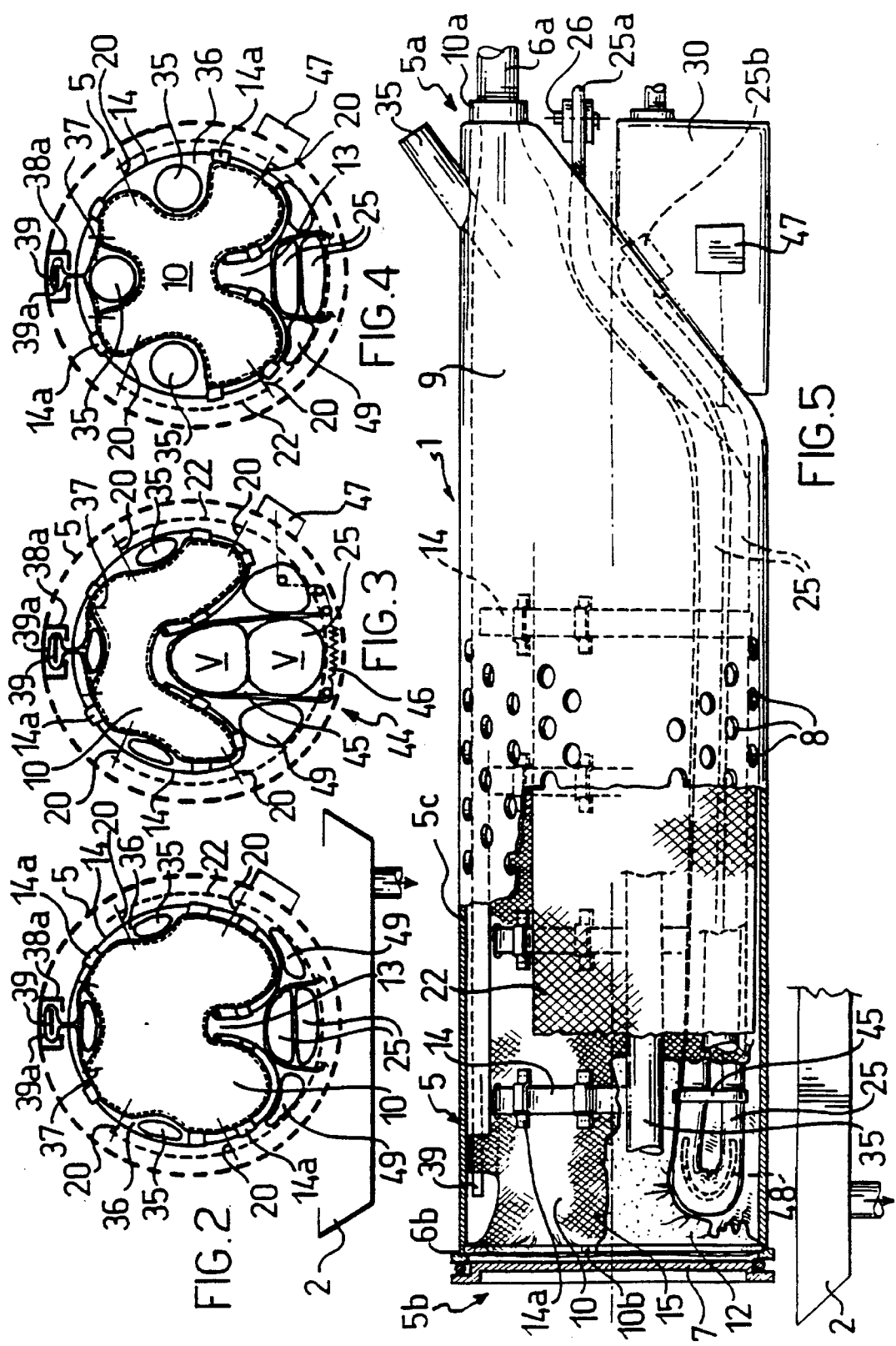

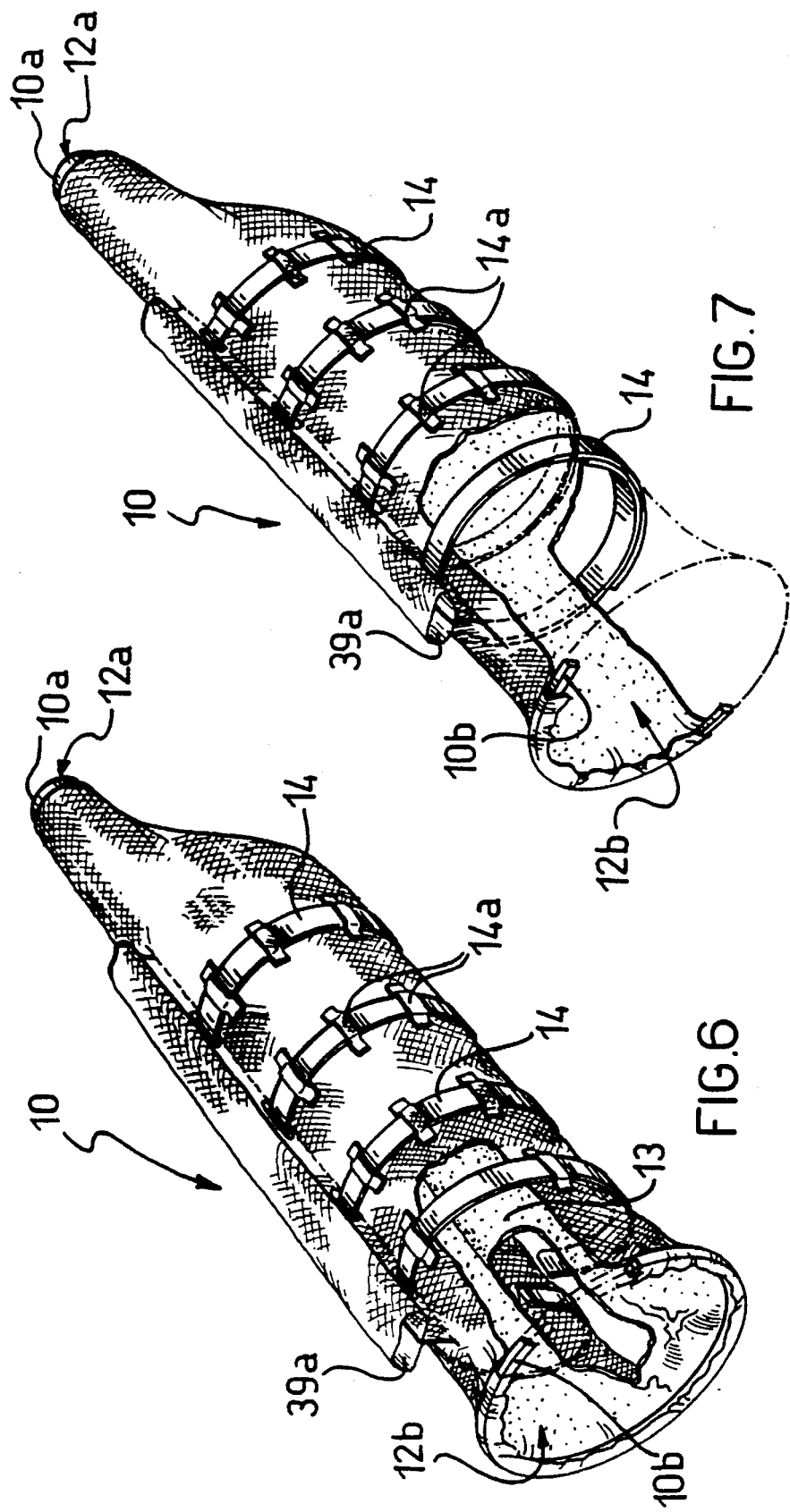

FILTER FOR THE SEPARATION OF SOLIDS AND LIQUIDS FROM MUDS AND SPECIFICALLY THOSE FROM INDUSTRIAL PROCESSING

BACKGROUND OF THE INVENTION

1. Field of the Invention

The present invention relates to a filter for the separation of solids and liquids from muds and specifically those from industrial processing.

Before continuing it is noted that in the present description and the claims the term muds means generally fluids of varying chemical composition and different physical properties which contain dispersed solid particles.

2. Description of the Background Art

The use of filters in industrial plants in general is now very widespread for reasons of environment protection, originating in the ever stricter standards applied and for more rigourously economic reasons. In many cases, indeed, environmental standards prescribe an obligation to dispose of a considerable number of substances from industrial processes in especially assigned centres. These substances are mostly present in fluids such as sewage and various type of muds and suspensions from chemical processes but it is not rare to find liquids used for cooling of machines. To limit the volume of fluid to be treated and reduce the quantity of material to be hauled in the disposal centres it is important to provide adequate separation of the solid component from the liquid in the fluid.

In addition, confirming the usefulness of the above mentioned filters, those industrial processes in whose waste fluids there are substances which it is advantageous to recover due to their high economic value must be taken into consideration. Of course, even in these cases the effectiveness of the solid and liquid separation operation is quite important.

From Italian patent no. 1.184.501 a filtering container is known for the separation of solids and liquids in which are provided two mutually moving overlying parts of which the first or upper defines a chamber for reception of a bag full of muds to be filtered while the second or lower is designed to penetrate through the base of the first substantially in the manner of a piston. As a result of the movement of the lower part the bag of mud is deformed and compressed so that the liquid contained therein can flow out through the filtering fabric of which the bag is made.

Another example of a mud filter substantially similar to the one described above is known from another Italian patent no. 1.188.227. Also in this second example there is a chamber for housing a bag of muds to be filtered and in which the volume is swept by a compressed air driven piston.

Basically, for both the above cases, operation of the filters calls for the relative movement of two coupled parts in which the filter structure is divided. Even though the procedures according to which said movement takes place are different, in one case gravity is used while in the other compressed air is used, the technical solutions proposed are unsatisfactory, especially as concerns the size and construction complexity of the filters obtained.

Indeed, there being provided two mutually moving parts, the travel of the latter necessitates adequate mechanical means, especially running guides, drive means and everything else, which make the filters very cumbersome and complicated, especially considering their yield and efficiency. This shortcoming must indeed be considered in the light of the industrial end purpose of these filters, which must treat high quantities of fluid while ensuring steady production over time associated with continuous operational reliability. It should be noted also that the parts making up the filter operate in contact with liquids of varying chemical composition in which there are also dispersed solid particles. Thus their mutual movements take place in particularly severe environmental conditions and may easily lead to failure.

SUMMARY OF THE INVENTION

The problem of the present invention is to provide a filter for the separation of solids and liquids from muds, and in particular those from industrial processing, where the number of moving parts is substantially reduced.

A filter apparatus is known from EP-A-0311716, wherein a conduit is helically wound about the outside of a filter media; the conduit is expanded by air pressure to break solid cake build up on the filter media during filtration.

This problem is solved by a filter for the separation of solids and liquids from muds and specifically those from industrial processing, comprising:

a container, a filtering bag housed in the container for reception of the muds, a deformable membrane housed in the container and defining therein a closed volume of variable size, fluid pumping means communicating with the volume, to vary the size of the volume by pumping fluid into the volume, thereby squeezing the filtering bag in the container, characterized by further comprising:

a first inlet mouth in the filtering bag for feeding the mud into the filtering bag a plurality of holes formed in the side wall of the container so that the filtered liquid can flow out, elastic means for ensuring elastic expansion of the bag against the variable volume.

In the container, squeezing of the filtering bag is achieved by enlarging the size of the volume defined by the membrane. Apart from the obvious slipping of expanding and contracting parts, there is no reciprocal movement between the parts of the filter: the filter is thus simple and reliable. The filtering bag being provided with elastic means for ensuring elastic expansion of the bag against the variable volume, when a squeezing phase is completed, the bag comes back to its original expanded shape, making it easier to discharge the solid and to supply other muds.

The container may have any suitable shape. Preferably, the container comprises:

a substantially tubular side wall extending between a first end having a first opening and a second end having a second opening closed by a plate, a cavity defined inside the container, open to the first and second openings, and in the filtering bag:

the first inlet mouth is open to the first opening of the container, a second discharge mouth is open to the second opening of the container.

This construction ensures a good strength and easy operations when feeding the muds (into the first inlet mouth through the first opening) and removing the solid (from the second discharge mouth through the second opening).

Pumping means may be any suitable device to feed a fluid under pressure, preferably a water pumping means.

Preferably, the filtering bag includes a filtering fabric and a drainage screen coupled together. This double layer construction makes it possible the outflow of liquid during squeezing even from those portions of the bag where the outer side is laying against a surface.

Preferably, the filter comprises a tension netting, formed substantially like a cradle and designed to receive the membrane together with the filtering bag, the latter being fastened to the tension netting. The netting may help in keeping the filtering bag in shape while resting and in guiding its deformation under squeezing.

Preferably, the elastic means comprises elastic bands surrounding the filtering bag, each elastic band being slidingly engaged in loop pockets formed on the outer side of the filtering bag. Such means are very simple and effective; moreover, when a bag must be replaced by a new one, the bands can be removed and used again with the new bag.

Preferably, the filtering bag is arranged in the container with a longitudinal fold extending radially inward of the container opposite the membrane, the membrane being capable of expanding in the fold in a predominantly radial direction in relation to the container. This fold makes the external surface—i.e. the filtering surface—of the filtering bag larger, with equivalent volume.

The membrane which makes the variable size volume may have any shape. In a preferred embodiment, the membrane includes a flexible U-bent tube extending between a first closed end located at the first end of the container and a second end communicating with pumping means. Such a simple membrane is capable of furnishing a good expansion of the volume and can easily operate under high pressure.

When the filtering process must be performed under very high pressure, it may be preferable that the membrane includes a bundle of flexible U-bent tubes, connected in parallel. In fact, such structure gives a smaller expansion ratio but can withstand much higher pressures.

Preferably, when the membrane is a U-bent tube, it comprises a rigid U-shaped pipe located inside the tube at the region where the tube is bent. The rigid pipe ensures fluid communication between the two portions of the tube, even when the membrane is deflated, avoiding the risk that the membrane does not deflate completely due to a flattening in the region of the bent at the initial stage of deflation.

Preferably, the filter comprises a stop device including a tape arranged in a loop around the volume, connected through a spring to a switch for operation of the pumping means. This arrangement is intended to stop automatically the inflation of the membrane in case a predetermined maximum expansion is achieved.

In a further aspect, the invention relates to a filtering bag, made out of a filtering fabric, for use in a filter according to the invention. Although in principle any filtering bag can be used in a filter according to the invention, it is highly preferred that the bag be capable of expanding elastically, because this ensures better operation of the filter, as explained above.

So, according to a first embodiment of the invention, the filtering bag comprises:

a first inlet mouth to be associated with a first opening of a container of the filter, engagement means to be associated with elastic means for ensuring elastic expansion of the bag in the container.

In this embodiment, elastic means are not a part of the bag itself, but are associated thereto.

Preferably, in the above case, the engagement means comprises loop pockets formed on the filtering bag for sliding engagement of elastic bands. It has already been discussed that this arrangement is preferred because of the possibility of using always the same elastic bands, even when changing the filtering bag.

Alternatively, the filtering bag may itself include the elastic means, and so it comprises:

a first inlet mouth to be associated with a first opening of a container of the filter, elastic means for ensuring elastic expansion of the filtering bag in the container.

Preferably, in both embodiments, the loop pockets are formed on outer side of the filtering bag, so it is easier to remove and to insert the elastic bands.

If the filtering bag has a substantially cylindrical shape, as it is normally preferred, the loop pockets are preferably disposed along circular paths. This means that deformations of the filtering bag occur substantially in a radial direction.

The filtering bag may be a disposable one, in the sense that it is to be disposed once it is full of solid. This may be useful in some special applications. In general, it is preferred that the bag comprises a second discharge mouth to be associated with a second opening of the container. Once full of solid, the bag can be emptied by discharging the solid through the discharge opening.

The filtering bag may or may not be provided with means for holding it in position inside the container. In general, the higher is the working pressure, the more is advisable to provide holding means for the bag, to avoid incorrect displacements.

So, preferably the filtering bag comprises a longitudinal pocket, for engagement of a rod to be inserted in a longitudinal guide of the container to hold the filtering bag in the container. This way of holding the bag is particularly simple and at the same time particularly strong and effective, since holding occur along the whole length of the bag.

Additional characteristics and advantages of the filter in accordance with the present invention are set forth in the description of an example of embodiment thereof given below by way of nonlimiting example with reference to the annexed drawings wherein:

BRIEF DESCRIPTION OF THE DRAWINGS

FIGS. 2 to 4 show a cross section of the filter of FIG. 1 in respective operating conditions;

FIG. 5 shows a longitudinal cross section of the filter of FIG. 1;

FIG. 6 shows a partially sectioned perspective view of a filtering bag for use in the filter of FIG. 1;

FIG. 7 shows a partially sectioned perspective view of a different embodiment of a filtering bag for use in the filter of FIG. 1.

DESCRIPTION OF THE PREFERRED EMBODIMENTS

Figure 1:
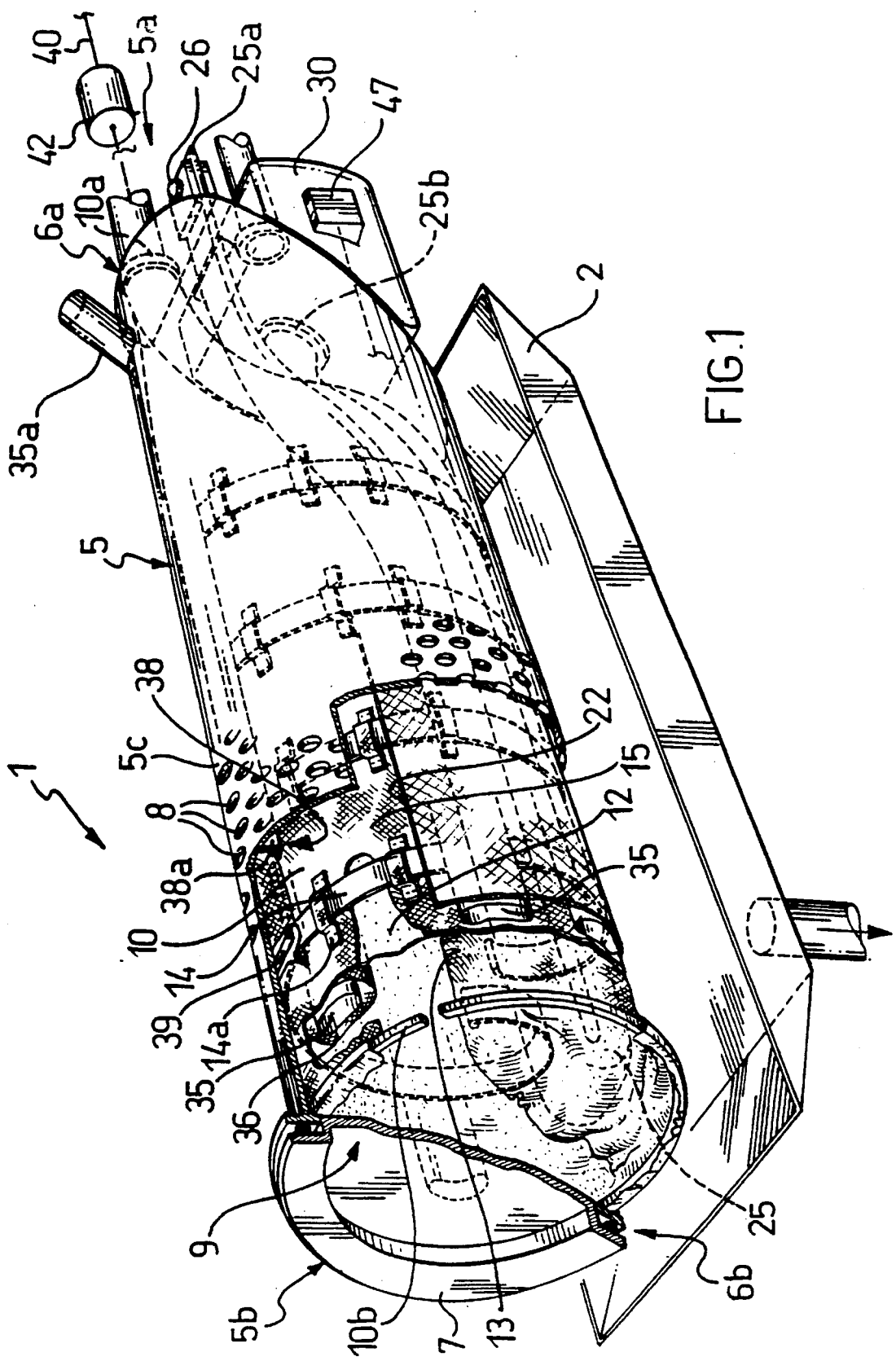
FIG. 1 shows a partially sectioned perspective view of a filter in accordance with the present invention.

With reference to the Figs. and in particular to FIG. 1 reference number 1 indicates as a whole a filter in accordance with the present invention arranged above a tank 2 for collection of filtered liquids.

The filter 1 comprises a container 5 extending between a tapered first end 5a provided with a first opening 6a and a second end 5b opposite the first one, provided with a second opening 6b, closed by a removable end plate 7. Plate 7 is fixed in a conventionally removable manner to the container 5. The container 5 has a tubular side wall 5c extending between the first and second ends 5a and 5b and provided with small holes 8 designed to allow outward passage of the liquid separated by the filter to run into the collection tank 2. The side wall, which in this example consists of a pierced metal sheet, could of course be provided in other forms such as for example a functionally equivalent metallic grate.

In the container 5 is defined a cavity 9 communicating with the openings 6a and 6b and with the holes 8, and in which is housed a filtering bag 10.

Said filtering bag 10 extends longitudinally inside the cavity 9 of the container 5 from a first inlet mouth 12a in correspondence of the first end 5a to a second discharge mouth 12b in correspondence of the second end 5b. The first mouth 12a is fixed to the first opening 6a by means of a collar 10a, while the second mouth 12b is fixed to the second opening 6b, by means of an elastically deformable ring 10b radially forcing the bag 10 against the side wall 5c of the container 5.

The bag 10 is provided with elastic means for ensuring elastic expansion of the bag 10 in the container 5. Such means include a number of elastic bands 14, surrounding the bag 10 and secured thereto by means of loop pockets 14a formed on the outer surface of the bag 10. In addition, in the embodiment of FIGS. 1 to 6, the bag 10 is kept folded longitudinally to form a radially extending fold 13 in its lower part by means of the same bands 14. In the embodiment of FIG. 7, instead, no fold is provided.

The fold 13 is obtained by making the bag 10 with a cross section (see FIG. 2) having a related perimeter sufficiently long to originate an excess of fabric which can, precisely, be folded radially in relation to the filtering bag 10 to form the above mentioned fold 13.

The filtering bag 10 is made with a two layers structure, including an inner layer 12 of filtering fabric and an outer drainage screen 15 coupled together. The screen 15, known independently, is flexible and allows down flow of the liquid emerging therefrom during operation of the filter as explained below.

The filtering bag 10 is affixed at a plurality of points 20 to a tension netting 22 which has a cross section corresponding to an arc of the circumference and constitutes a cradle for reception of the bag 10. Between the tension netting 22 and the bag 10 and in a position adjacent to the fold 13 is an elastic membrane 25 which is deformable in the fold 13. The membrane 25 consists in this example of a flexible tube substantially bent in the form of a letter U and closed at its first end 25a which is fixed by bolts 26 to the container 5 at the opening 6 thereof. The flexible tube also communicates at another end 25b with pumping means 30 for supply of water to its interior. In practice, the membrane 25 defines inside the container 5 a closed volume V of variable size.

In the filter 1, inside the container 5, are also provided dilatable elements 35 designed to detach the solid component of the filtered muds from the filtering fabric 12. The dilatable elements 35 are housed in respective seats 36 arranged peripherally in relation to the filtering bag 10 and, in particular, two of them are formed between two of the points 20 of attachment of the filtering bag 10 to the tension netting 22 advantageously located near each other. Above the filtering bag 10 there is another of the seats 36 formed by two points 37 for fastening the filtering fabric 12 to the drainage screen 15.

In addition, the latter seat 36, which is above the filtering bag 10, is juxtaposed to a guide 38 made up of a pair of L sections 38a affixed to the container 5 and designed to receive a rod 39 inserted in a longitudinal pocket 39a formed in the bag 10, to hold the filtering bag 10 in the container 5.

The dilatable elements 35 have tubular form, closed at a first end and communicating at a second end 35a with an air compressor not shown in the drawings. The ends 35a are located near the end 5a of the container 5.

In the filter in accordance with the present invention there are provided means 40 of feeding the muds into the bag 10 through the mouth 12a thereof. The means are conventional and include conveyance ducts as well as feed pumps only shown diagramatically in the drawings annexed to the present description.

It is also noted that opposite the mud feed means 40 there is provided a check valve 42 to prevent the muds to be filtered from flowing back through the mouth 12a of the bag 10 during operation of the filter.

Finally, to control operation of the filter 1 there are also provided conventional means designed to measure the pressure of the muds inside the bag 10 and not shown while there is illustrated in detail a stop device 44 associated with the membrane 25. The device 44 consists essentially of a tape 45 closed in a loop around the two branches bent in a U of the flexible tube which forms the membrane 25 and coupled with a spring 46 in turn connected with a switch 47 for control of the pumping means 30.

In addition, inside the flexible tube which constitutes the membrane 25 there is a pipe 48, also flexible although stiffer than the membrane 25, located at the region where the tube is bent, right in the knee formed in the bent tube.

Additionally, a pair of guide membranes 49 may be provided on either sides of the membrane 25. These membranes 49, inflated simultaneously with the membrane 25, do not cooperate in squeezing the bag 10 but only guide the expansion of the volume V toward the middle of the container 5.

The functions of the elements of the filter 1 described above are clarified by the following description of the operation of the filter in accordance with the present invention.

Since the capacity of the filter 1 and the bag 10 with which it is provided are of course limited there are given below the operating procedures with which the filter 1 operates in relation to a correspondingly limited Mount of muds present in the bag 10. Of course the following description can be applied to a continuous operation of the filter 1 merely repeating the successive phases in which its operation is articulated for the limited amount mentioned above.

Once the bag 10 is filled with muds by the feeding means 40, the check valve 42 is closed so that, as mentioned above, it prevents the muds from flowing back. After the end of this preliminary phase, the filtering bag 10 assumes the operational configuration shown in FIG. 2.

Starting from this operating condition, the membrane 25 is then deformed by feeding water into it with the pumping means 30 connected to its open end 25b. This causes a consequent increase in the volume V defined by the membrane which is arranged as clearly illustrated in FIG. 3, i.e. the flexible tube bent and initially flattened deforms while expanding radially in relation to the filtering bag 10 inside the fold 13. The deformation of the membrane 25 causes a dual action on the bag 10 containing the muds.

A first action is bag compression or squeezing, causing outward flow of the liquid present in the muds through the filtering fabric of the bag. Said outward flow is also aided by the presence of the drainage screen 15 whose meshes constitute a hollow space into which the outward flowing liquid can run also at those points of the bag such as for example those at which the membrane 25 operates and in which the outward flow would be prevented because of a direct contact between the filtering fabric and a continuous surface compressing it. Indeed, it is clear that if there were a direct contact between the filtering fabric and the membrane or between the former and the wall of the container 5 where of course there are no holes 8 thereof, the liquid in the muds could not pass out of the bag at these points.

The membrane 25 then causes a second action, i.e. deformation of the bag 10 with the muds in it and which assumes a particular arched configuration thanks to which it is possible to obtain a nearly uniform thickness of the mass of muds measured radially in relation to the filtering bag. Indeed, it is known that the uniform thickness is a factor aiding filtering efficiency.

It is noted that in the present embodiment the above actions produced by the membrane 25 are achieved also as a result of the reaction force offered by the fixing points 20 of the bag 10.

Concerning the second action of the membrane 25, i.e. deformation of the bag 10 with the muds contained therein achieving a substantially constant radial thickness, there should be noted the importance of the presence of the fold 13. This constitutes a preferred location in which the membrane 25 can expand radially in relation to the filtering bag 10.

It is also noted that another effect of the presence of the fold 13 can be readily inferred by comparing the configurations assumed by the bag 10 in FIGS. 2 and 3. It is observed that the fold 13 permits practically increase of the surface of the bag through which the liquid separated from the muds is made to flow outward. This is understandable if it is remembered that if the bag 10 did not have this fold, its surface available for outward flow of the liquid separated from the muds would be equal to that seen in FIG. 2 excepting the surface corresponding to the presence of the fold 13. The effectiveness of the filter in accordance with the first embodiment of present invention (FIGS. 1 to 6) for a given initial filling capacity is therefore greater than that of a filter according to the second embodiment (FIG. 7), i.e. not having a fold. The embodiment without fold is preferrable for its simpler construction when a less efficient filtering action is anyway acceptable.

After complete compression of the bag 10 and related muds contained therein, the membrane 25 is returned to a non-operating condition allowing the water previously pumped into it to flow out. Elastic action of bands 14 tends to expand the bag 10 to its original condition, thereby causing a compression of the volume V. It is also underscored that in the membrane 25 formed by a bent flexible tube such as in the case considered, the pipe 48 is particularly advantageous. Indeed, it allows outflow of the water in the flexible tube even at its knee bend. Indeed, if the pipe were not provided, the weight of the muds and the pressure of the water remaining in the flexible tube would prevent down flow of the water in the branch of the tube extending from the closed end 25a.

At this point it is important to observe that the choice of a membrane made up of a flexible tube bent like the letter U allows the considerable advantage of achieving a deformation of the membrane, radially in relation to the filtering bag 10, without at the same time excessive expansion-thereof in width. In other words, it would have been possible to conceive having recourse to a straight flexible tube instead of one bent into the shape of the letter U but in this case to secure the same radial deformation the tube to be used would have to have a diameter double that of the one used in the illustrated example so that its deformation would have resulted in excessive space occupied and less efficiency of penetration of the membrane 25 into the fold 13 of the bag.

In addition it should be noted that end plate 7 allows easy removal of the bag 10 and considerable facilitation of all filter maintenance operations in general.

Finally, for control of the operation of the filter there is to be noted the presence of the stop device 44 which allows effective control of the dilatation of the membrane 25 and, consequently, also its action on the bag 10 with the muds. This device proved to be quite simple and reliable in operation because as the flexible tube which constitutes the membrane 25 increases in size because of the amount of water pumped into it by the means 30, the tape 45 of the device is placed under traction and with it also the spring 46. At the maximum dilatation of the membrane 25 the spring 46 disconnects the switch 47 which controls the pumping means 30 thus preventing damage to the membrane.

With reference to FIG. 4 there is indicated the operation of the dilatable elements 35 provided in the filtering bag 10. Indeed, after completion of the filtering operation just described, i.e. once the membrane 25 has returned to the non-operating condition, the dilatable elements 35 are in turn dilated by feeding into their interior air supplied by the compressor provided for the filter. Said dilatation causes detachment of the solid particles of the muds separated from the filtering fabric of which the bag 10 is made to unclog it and make it ready for another filtering phase.

This peculiarity of the filter in accordance with the present invention is extremely advantageous for those muds in which the solid component is the colloidal type or, in any case, adheres to the filtering fabric 12.

Naturally to the above embodiment of the present invention there can be made modifications and variations depending on the different operating circumstances which might occur in practice.

One of these modifications could be that represented by a filter in which the bag 10 is not provided with the second mouth. In such a case the bag is to be disposed together with the solid materials collected therein.

Another conceivable variation in comparison with the above descriptions could consist of a filter in which the filter 1 does not include the tension netting 22. In this case it might be thought to arrange the membrane 25 and the bag 10 directly inside the container 5 while fastening it thereto in a manner similar to the instruction given for the above example.

It is clear that in the membrane 25 there could be delivered, instead of the water fed by the pumping means 30, air or another fluid achieving in any case the same deformation effect on the bent flexible tube. As concerns the latter, it is hardly necessary to point out that it could be replaced by other forms of membrane which should in any case display the same functional dynamics set forth above for the bent flexible tube.

In other words, membranes equivalent to the bent tube would be those capable of defining a variable volume V inside the filter container 5 and communicating with the pumping means 30 so as to be able to deform the membrane with water or some other fluid and consequently causing compression of the muds present in the container and the desired separation of liquids and solids.

It should also be remembered that in the filters in accordance with the present invention the muds have been advantageously collected in the bag 10 so that the action of the membrane 25 is aided by this fact in accordance with the above description. Despite this, to achieve a filter in accordance with the instructions in conformity with the present invention a single filtering container in which to house the muds would suffice together with the membrane defining in the container a volume of variable size.

Finally, it is noted that for the purpose of aiding the introduction of muds and avoiding seagnation thereof, in the filter example described- above the end 5a of the container 5 is tapered. This shape prevents the presence of muds to be filtered in a zone of the filtering bag 10 where, if it were not provided, there would be felt edge effects and the action of the membrane 25 would not be optimal.

I claim:

1. Filter for the separation of solids and liquids from muds comprising:

a container (5), a filtering bag (10) housed in the container (5) for reception of the muds, a deformable membrane (25) housed in the container (5) and defining therein a closed volume (V) of variable size, fluid pumping means (30) communicating with the volume (V), to vary the size of the volume (V) by pumping fluid into the volume (V), thereby squeezing the filtering bag (10) in the container (5), a first inlet mouth (12a) in the filtering bag (10) for feeding the mud into the filtering bag (10), a plurality of holes (8) formed in the side wall (5c) of the container (5) so that the filtered liquid can flow out, elastic means (14, 14a) for ensuring elastic expansion of the bag (10) against the variable volume (V).

2. Filter according to claim 1, wherein the container (5) comprises:

a substantially tubular side wall (5c) extending between a first end (5a) having a first opening (6a) and a second end (5b) having a second opening (6b) closed by a plate (7), a cavity (9) defined inside the container (5), open to the first and second openings (6a, 6b), and wherein in the filtering bag (10):

the first inlet mouth (12a) is open to the first opening (6a) of the container (5), a second discharge mouth (12b) is open to the second opening (6b) of the container (5).

3. Filter according to claim 1, wherein the pumping means includes water pumping means.

4. Filter according to claim 1, wherein the filtering bag (10) includes a filtering fabric (12) and a drainage screen (15) coupled together.

5. Filter according to claim 1, comprising a tension netting (22), formed substantially like a cradle and designed to receive the membrane (25) together with the filtering bag (10), the latter being fastened to the tension netting (22).

6. Filter according to claim 1, wherein the elastic means comprises elastic bands (14) surrounding the filtering bag (10), each elastic band (14) being slidingly engaged in loop pockets (14a) formed on the outer side of the filtering bag (10).

7. Filter according to claim 2, wherein the filtering bag (10) is arranged in the container (5) with a longitudinal fold (13) extending radially inward of the container (5) opposite the membrane (25), the membrane (25) being capable of expanding in the fold (13) in a predominantly radial direction in relation to the container (5).

8. Filter according to claim 2, wherein the membrane (25) includes a flexible U-bent tube extending between a first closed end (25a) located at the first end (5a) of the container (5) and a second end (25b) communicating with pumping means (30).

9. Filter according to claim 8, wherein the membrane (25) includes a bundle of flexible U-bent tubes, connected in parallel.

10. Filter according to claim 8, wherein the membrane (25) comprises a pipe (48) located inside the tube at the region where the tube is bent.

11. Filter according to claim 1, comprising a stop device (44) including a tape (45) arranged in a loop around the volume (V), connected through a spring (46) to a switch (47) for operation of the pumping means (30).

12. Filter according to claim 1, with said filtering bag comprising:

a first inlet mouth (12a) to be associated with a first opening (6a) of a container (5) of the filter (1), engagement means (14a) to be associated with elastic means (14) for ensuring elastic expansion of the bag (10) in the container (5).

13. Filter according to claim 12, wherein the engagement means comprises loop pockets (14a) formed on the filtering bag (10) for sliding engagement of elastic bands (14).

14. Filter according to claim 1, comprising:

a first inlet mouth (12a) to be associated with a first opening (6a) of a container (5) of the filter (1), elastic means (14, 14a) for ensuring elastic expansion of the filtering bag (10) in the container (5).

15. Filter according to claim 12, wherein the elastic means comprises:

elastic bands (14) to be associated with the filtering bag (10), loop pockets (14a) formed on the filtering bag (10) for sliding engagement of the elastic bands (14).

16. Filter according to claim 13, wherein the loop pockets (14a) are formed on outer side of the filtering bag (10).

17. Filter according to claim 13, having a substantially cylindrical shape, wherein the loop pockets (14a) are disposed along circular paths.

18. Filter according to claim 12, comprising a filtering fabric (12) and a drainage screen (15) coupled together.

19. Filter according to claim 12, comprising a second discharge mouth (12b) to be associated with a second opening (6b) of the container (5).

20. Filter according to claim 12, comprising a longitudinal pocket (39a), for engagement of a rod (39) to be inserted in a longitudinal guide (38) of the container (5) to hold the filtering bag (10) in the container (5).

21. Filter according to claim 15, wherein the loop pockets are formed on the outer side of the filtering bag.

22. Filter according to claim 15, having a substantially cylindrical shape, wherein the loop pockets are disposed along circular paths.

23. Filter according to claim 14, comprising a filter fabric and a drainage screen coupled together.

24. Filter according to claim 14, comprising a second discharge mouth to be associated with a second opening of the container.

25. Filter according to claim 14, comprising a longitudinal pocket, for engagement of a rod to be inserted in a longitudinal guide of the container to hold the filtering bag in the container.

* * * * *